United States Patent [19]
Fuhrmann et al.

[11] 3,922,265
[45] Nov. 25, 1975

[54] REARRANGEMENT OF AMINOCYCLOALKANONE OXIMES TO THE CORRESPONDING LACTAMS

[75] Inventors: Robert Fuhrmann, Morris Plains; Allen A. Tunick, Denville; Stylianos Sifniades, Madison, all of N.J.

[73] Assignee: Allied Chemical Corporation, New York, N.Y.

[22] Filed: Jan. 16, 1974

[21] Appl. No.: 433,967

[52] U.S. Cl. ................... 260/239.3 R; 260/293.86
[51] Int. Cl.² .............. C07D 223/10; C07D 211/76
[58] Field of Search ............... 260/239.3 A, 293.86, 326.5 FN

[56] References Cited
UNITED STATES PATENTS

| | | | |
|---|---|---|---|
| 2,716,114 | 8/1955 | Blaser et al. | 260/239.3 A |
| 2,716,115 | 8/1955 | Blaser et al. | 260/239.3 A |
| 2,744,107 | 5/1956 | Welz | 260/239.3 A |
| 3,641,003 | 2/1972 | Ito et al. | 260/239.3 A |

Primary Examiner—Henry R. Jiles
Assistant Examiner—Robert T. Bond
Attorney, Agent, or Firm—Arthur J. Plantamura; Ellen T. Dec

[57] ABSTRACT

$\alpha$-amino-$\delta$-valerolactam and $\alpha$-amino-$\epsilon$-caprolactam are produced by contacting the corresponding $\alpha$-aminocycloalkanone oxime or mineral acid salt thereof with liquid $SO_2$ containing at least about 1 mole $SO_3$ per mole $\alpha$-aminocycloalkanone oxime until a two-phase system comprising a liquid $SO_2$ phase and an insoluble lactam precursor phase is formed; separating the liquid $SO_2$ phase from the insoluble phase containing the lactam precursor; hydrolyzing and neutralizing the insoluble lactam precursor phase and recovering the free lactam product.

8 Claims, No Drawings

REARRANGEMENT OF AMINOCYCLOALKANONE OXIMES TO THE CORRESPONDING LACTAMS

FIELD OF THE INVENTION

This invention is directed to the Beckmann Rearrangement of α-aminocyclopentanone and α-aminocyclohexanone oximes to the corresponding αamino-ω-lactams using $SO_3$ in liquid $SO_2$ as the reagent.

DESCRIPTION OF THE PRIOR ART

The Beckmann rearrangement of cycloalkanone oximes and their salts to produce the corresponding lactams using traditional "Beckmann rearrangement agents" is a conventional technique. Since unsubstituted alicyclic ketoximes have a symmetrical structure, the Beckmann rearrangement mechanism can lead to only one product, i.e.

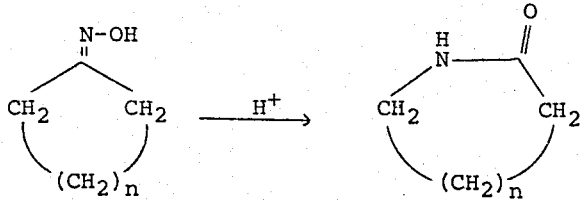

However, the conventional reagents which were so effective in the rearrangement of alicyclic ketoximes are not effective in the conversion of substituted ketoximes possessing α-amino substituent groups. For example, in α-aminocyclohexanone oxime, the predominant isomer has the amino group in the anti-position to the oxime group. Under these circumstances, the use of most of the common Beckmann rearrangement agents produces primarily decomposition products deriving from intermediate ω-amino-ε-caprolactam, and only small amounts of α-amino-ε-caprolactam, a valuable lysine precursor. When conventional Beckmann reagents are employed with α-aminocyclohexanone oxime the reaction proceeds as follows:

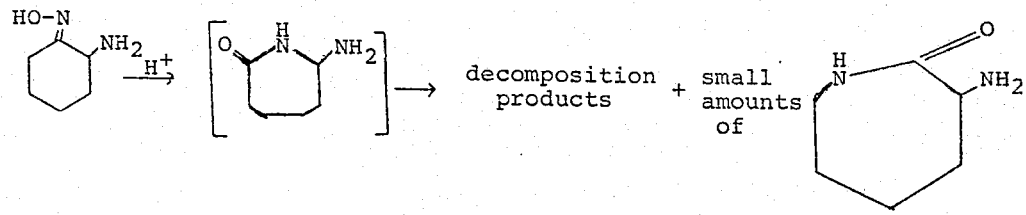

Accordingly, conversions of α-aminocyclohexanone oximes with conventional Beckmann rearrangement agents such as sulfuric acid, phosgene, phosphoric acid, $P_2O_5$, etc. have been found to produce ≤20% of the desired α-amino-ε-caprolactam.

Ito et al. in the U.S. Pat. No. 3,641,003 indicate that the desired conversion will occur if the substituted cycloalkanone oxime, particularly the oxime hydrochloride, is reacted with $HSO_3Cl$ or $SO_3$ in certain specific solvents, i.e. in the following solvent systems:

$SO_3 + H_2SO_4$
   $SO_3 + H_2SO_4 +$ nitrobenzene
   $HSO_3Cl + H_2SO_4$
   $HSO_3Cl$ used as both reagent and solvent
   $HSO_3Cl +$ dichloroethane
   $SOCl_2 + H_2SO_4$ It is postulated that the use of these particular combinations by Ito et al. causes formation of a heterocyclic intermediate having a syn-configuration. However, there is no way to predict what other reagents would cause the formation of such an intermediate.

An alternative Beckmann rearrangement mechanism has been proposed in Japanese Patent 48 10788 involving the use of sulfuric acid containing relatively small amounts of $SO_3$. In the first stage of this operation, the anti-aminocyclohexanone oxime is converted to the syn-isomer. In the second stage, the syn-isomer is converted to the lactam without the necessity of formulating the heterocyclic intermediate.

In accordance with the method taught by Ito et al., it is essential that at least two moles of $HSO_3Cl$, $H_2SO_4$ or $SO_3$ per mole oxime be used. Japanese Patent 73 10788 requires the use of at least 4 moles $H_2SO_4$ — $SO_3$ per mole oxime. Thus, according to both methods, the resulting lactam product is present in the form of a solution in a large excess of sulfuric acid containing unreacted $SO_3$ or $ClSO_3H$. This solution must then be neutralized in order to recover the desired lactam. This neutralization step is usually carried out with ammonia and the rearrangement agent is then recovered as ammonium sulfate. By using these techniques, large quantities, (i.e. considerably more than 5 moles per mole lactam) of combined ammonium sulfate and ammonium chloride by-product result. Specifically, a minimum of 6 moles ammonium sulfate and 3 moles ammonium chloride are formed when the chlorosulfonic acid/sulfuric acid system is employed. The formation of these large amounts of $NH_4Cl$ also contaminates the ammonium sulfate by-products after neutralization of the rearrangement mixture and thereby restricts severely its use as a fertilizer. In order to obtain favorable yields of the lactam using the $SO_3/H_2SO_4$ system with ACO-HCl as disclosed by Ito et al., 8 moles ammonium sulfate and 1 mole $NH_4Cl$ are produced.

While the $H_2SO_4/SO_3$ system disclosed in the Japanese reference results in the formation of only 1 mole $NH_4Cl$, at least 4 moles $(NH_4)_2SO_4$ are produced.

Moreover, using the rearrangement systems of Ito et al. and of the Japanese reference, the solvents, specifically $H_2SO_4$, $HOS_3Cl$, etc., function not only as solvents for the reagents but also as solvents for the lactam product. It is thus necessary to perform further complicated operations to remove the lactam from the solution. Thus, since these sulfate-containing reagent systems previously employed have been found to be disadvantageous due to excessive by-product formation and solubility of product, there is a need for other reagents which will give high yields of the corresponding α-amino-ω-lactam which can be readily recovered in its solid form while resulting in the production of a by-product having widespread commercial usage and containing relatively little ammonium chloride contamination.

SUMMARY OF THE INVENTION

In accordance with the procedure of the present invention, it has been found that the use of $SO_3$ in liquid $SO_2$ as the Beckmann rearrangement system produces high yields of α-amino-ε-caprolactam and α-amino-δ-valerolactam. These lactam compounds may be represented by the general formula:

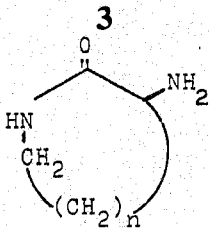

wherein $n$ is an integer 2 or 3. Moreover, since these reaction products are insoluble in this specific medium, the product may be easily recovered by filtration and the solvent recycled without neutralization. An additional feature of this method is that relatively small amounts (i.e. less than 3 moles) of ammonium sulfate per mole oxime are formed upon neutralization of the reaction mixture and only one mole of the $NH_4Cl$ per mole oxime hydrochloride is produced.

This invention is thus directed to a method for the production of $\alpha$-amino-$\delta$-valerolactam and $\alpha$-amino-$\epsilon$-caprolactam comprising the steps of contacting the corresponding $\alpha$-aminocycloalkanone oxime or mineral acid salt thereof with liquid sulfur dioxide containing at least about 1 mole sulfur trioxide per mol oxime until the rearrangement is complete and a two-phase system comprising a liquid $SO_2$ phase and an insoluble lactam precursor phase forms; separating the liquid sulfur dioxide phase from the insoluble phase containing a lactam precursor; hydrolyzing and neutralizing the insoluble lactam precursor phase; and recovering the free lactam product.

The totally unexpected advantages to the use of $SO_2$ over $H_2SO_4$ as a solvent for the $SO_3$ Beckmann reagent may be tentatively explained by the fact that the lower dielectric constant of the $SO_3/SO_2$ system influences the rates of ring closure and rearrangement reactions thereby optiming formation of the postulated syn configuration intermediate, i.e.

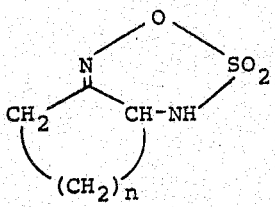

which is readily converted to the postulated lactim compound:

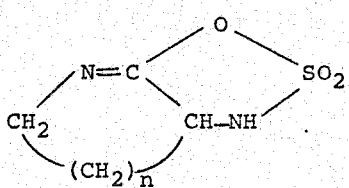

This lactim compound is then hydrolyzed to form the desired amino-substituted lactam product in the form of the sulfate salt which is neutralized to produce the free latcm product. The hydrolysis and neutralization operations are most conveniently carried out simultaneously by employing an aqueous solution of ammonium sulfate and ammonia.

Although rearrangement of unsubstituted oximes such as cyclohexanone oxime occurs in homogeneous form in liquid $SO_2$, we have surprisingly found that in the case of amino substituted cyclopentanone and cyclohexanone oximes, the resulting rearrangement product is insoluble in the liquid $SO_2$ prior to neutralization. Accordingly, substantially all the solvent, i.e. the $SO_2$, can be removed from the system by filtration or decanting techniques and this relatively large amount of $SO_2$ need not be subjected to any neutralization. Thus, according to the method of the present invention, the energy expended to neutralization operations as well as the amount of by-product produced is substantially reduced. In particular, the amount of product which must be neutralized comprises only that produced by the amount of $SO_3$ in the reaction mixture as well as by HCl present in the starting oxime salt and no neutralization of solvent is required. Moreover, the removal of liquid $SO_2$ solvent by decanting, centrifuging or filtering is far more simple and economical than the flash evaporation of the bulk of the solvent followed by compression of the latter as required in prior Beckmann rearrangement systems using $SO_2$.

This method may also be easily adapted to the continuous production of the amino lactam by simply recycling the $SO_2$ solvent with no requirement to distill or extensively refine the volatile solvent.

DESCRIPTION OF THE PREFERRED EMBODIMENTS

The $\alpha$-amino-cycloalkanone oximes useful as starting materials in the present invention may be represented by the general formula:

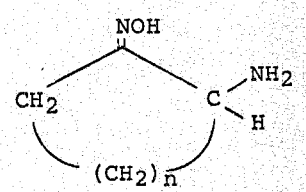

where $n$ is a positive integer and may be 2 or 3. These oximes may be prepared using conventional methods such as amination of the corresponding chloro-nitroso cycloalkane dimers as disclosed in British Patent No. 1,279,906. Although the oxime may be used as a free base, higher yields are attained using the oxime in the form of a salt with a strong mineral acid such as the sulfate or phosphate or preferably, the hydrochloride.

The Beckmann rearrangement reagent used in our novel process, $SO_3$ in liquid $SO_2$, may be readily obtained by partial catalytic oxidation of $SO_2$ followed by condensation of the gaseous $SO_2$ and $SO_3$ mixture. The $SO_3$ should be present in amounts of about 1 to 5 moles, preferably about 1.5 to 2.5 moles $SO_3$ per mole oxime. The mole ratio of $SO_2$ to $SO_3$ is about 2 to 20 moles $SO_2$ per mole $SO_3$, preferably about 2 to 10 moles $SO_2$ per mole $SO_3$. Amounts of $SO_3$ in excess of about 5 moles per mole oxime and of $SO_2$ in excess of about 20 moles per moles $SO_3$ may be employed; however, no substantial benefit is known to ensue.

We have found reaction temperatures of about 25°–125°C., preferably about 30°–80° to give favorable results at pressures of about 3 to 50 atmospheres although other temperatures and pressure conditions may be employed.

The reaction is preferably carried out by combining the $SO_3$ and the liquid $SO_2$ before gradually introducing the $\alpha$-amino-cycloalkanone oxime or its mineral acid salt. Alternatively $SO_3$ may be added to the mixture of α-amino-cycloalkanone oxime and $SO_2$. Since the reaction is exothermic, appropriate cooling means should be incorporated within the system.

Depending upon temperature, reactants, concentrations and other variables, the reaction is complete within less than about 5 hours, generally in 1 to 3 hours. Completion of the reaction can be determined by observing the disappearance of the oxime by thin layer chromotography.

A heterogeneous solid phase separates out of the mixture during the course of the reaction. It is postulated that this solid is the lactam precursor, α-amino-ω-lactim sulfate, which is insoluble in $SO_2$. This precursor phase is readily removed using conventional filtration or decanting techniques. This step can be performed at atmospheric pressure and temperatures below about −10°C. or at higher temperatures under suitable pressure conditions. The resulting filtrate or supernatant liquid containing substantially all the $SO_2$ solvent is simply recycled. Optionally, a portion of the $SO_2$ recycle stream may be purged and sent to a purification process, consisting of distillation from the small amounts of soluble by-products. The remaining insoluble phase containing the solid lactam precursor is then hydrolyzed at about 0°–10°C. to produce the lactam in the form of its sulfate salt and neutralized to yield the free lactam product. This hydrolysis and neutralization may be performed in separate operations but is most conveniently carried out simultaneously using aqueous ammonia, or preferably, an aqueous solution of ammonium sulfate and ammonia. The lactam in the form of the free base is then readily isolated using a variety of methods including solvent extraction and ion exchange procedures. The neutralization by-products are removed and the lactam recovered or further treated in accordance with its ultimate usage.

The resulting lactams can be easily hydrolyzed to produce the corresponding α-aminocarboxylic acids. In particular, α-amino-ε-caprolactam can be hydrolyzed with more than 2 moles HCl per mole lactam to produce lysine dihydrochloride.

The following examples will serve to further illustrate this invention.

EXAMPLE 1

A 15 ml (335 mmole) portion of liquid $SO_2$ was condensed into a 100 ml aerosol compatibility tube containing an efficient magnetic stirring bar. A 2.0 ml (3.8 g, 48 mmole) sample of liquid $SO_3$ was added, and the resulting solution treated at ≤−50°C. (external dry-ice/acetone bath) and with good stirring with 3.29 g (20 mmoles) of 2-aminocyclohexanone oxime hydrochloride (ACO.HCl). The tube was closed and warmed to 40°C., and the temperature maintained for two hours with good stirring. During this period, a second semisolid-liquid phase or viscous solid formed. The mixture was then cooled in dry ice and the tube opened and treated with 15 g. ice. The tube was resealed and warmed to melt the ice and complete hydrolysis. The $SO_2$ was then allowed to evaporate, and the residual aqueous solution was neutralized with aqueous ammonia. For the purposes of yield determination, the resulting solution was then placed on a basic ion-exchange column (120 ml Dowex IX-8) and eluted with water. The eluate (500 ml) was taken to dryness (rotary evaporator), and the residual oil dissolved in 25 ml. absolute ethanol. The ethanol solution was acidified with a concentrated solution of dry HCl gas in absolute ethanol, and the resulting precipitate of 2-aminocaprolactam hydrochloride (ACL-HCl) collected by filtration and washed with absolute ethanol. After drying in vacuo the yield was 2.20 g (64.6%). The mother liquor and washings were combined and concentrated to afford a second crop weighing 0.08 g. Total yield of pure 2-aminocaprolactam hydrochloride was thus 2.28 g (66.9%).

EXAMPLE 2

To illustrate the simplicity with which the product can be recovered and the fact that the $SO_2$ can simply be decanted from the system with no substantial loss of product, the procedure of Example 1 was repeated, however, after the two hour reaction period, the mixture was cooled to −20°, the supernatant liquid $SO_2$ decanted and the remaining lactim-containing solid phase treated with 15 gm ice water. This lactim mixture was then neutralized with sodium hydroxide and the resulting amino-lactam was extracted using glyme as a solvent. After drying the yield obtained was substantially equal to that obtained in Example 1. Little or no product was removed with the decanted $SO_2$ as shown by evaporation of the decanted $SO_2$.

EXAMPLE 3

An illustrative continuous process for the production of α-amino-ε-caprolactam is described. Aminocyclohexanone oxime.HCl and $SO_3$ were combined with recycled $SO_2$ and the mixture was treated as in Example 2. After filtration of the lactim containing phase a portion of the $SO_2$ stream was purged to eliminate small amounts of soluble material and combined with the remaining $SO_2$ for recycle to the reactor. The solid lactam precursor was contacted with aqueous solution of ammonia and $(NH_4)_2SO_4$ to hydrolyze and neutralize the aminocaprolactam precursor thereby producing the aminocaprolactam product. The solution was subjected to partial evaporation to remove any remaining small amounts of $SO_2$ and then the mother liquor containing the α-amino-ε-caprolactam was extracted with hot toluene (ca. 70°C.). Upon cooling, the α-amino-ε-caprolactam crystallized and could be readily separated from the toluene which is then recycled to the extraction step. The portion of the extract containing the $(NH_4)_2SO_4$ was filtered to remove the $(NH_4)_2SO_4$ crystals and the aqueous $(NH_4)_2 SO_4$ liquor was then recycled to the hydrolysis operation.

EXAMPLE 4

The procedure of Example 2 was repeated using α-amino cyclopentanone oxime hydrochloride to produce α-amino-ω-valerolactam.

EXAMPLE 5

To show the unique characteristics of the $SO_3/SO_2$ Beckmann reagent system as disclosed herein, the procedure of Example 2 was repeated using other known Beckmann reagents in $SO_2$ solvent. The results are shown in Table I.

TABLE I

| ACO Salt | Solvent | Catalyst | Temp. °C. | Time hr. | Approx. Conv'n (%) | Approx. Yield (%) |
|---|---|---|---|---|---|---|
| .HCl | $SO_2$ | $SO_2Cl_2$ | 35 | 2 | 75 | trace |
| .HCl | $SO_2$ | $ClSO_3H$ | 44 | 2 | 80 | 50 |
| Base | $SO_2$ | $POCl_3$ | 48 | 2 | 100 | 20 |
| .HCl | $SO_2$ | $P_2O_5$ | 45 | 2.5 | — | 45 |
| .HCl | $SO_2$ | PPA | — | — | — | (Not miscible) |

EXAMPLE 6

The procedure of Example 2 was repeated using various reaction proportions, conditions and isolating procedures. The results are shown in Table II.

TABLE II

| Vol. $SO_2$ (ml) | Moles $SO_3$ per Mole ACO | Temperature (°C.) | Time (hr.) | Isolation Procedure | Isolated Yield (%) |
|---|---|---|---|---|---|
| 15 | 2.0 | 25 | 70 | cation exchange | 61.0 |
| 15 | 2.0 | 25–30 | 4 | toluene extraction | 56.4 |
| 15 | 2.2 | 35 | 2 | cation exchange | 67.4 |
| 30 | 2.4 | 40 | 2 | anion exchange | 66.9 |
| 15 | 2.4 | 40 | 2 | anion exchange | 63.6 |
| 20 | 2.4 | 25 | 4 | anion exchange | 61.2 |
| 20 | 2.4 | 50 | 2 | anion exchange | 66.0+ |
| 15 | 2.4 | 80 | 1.2 | anion exchange | 61.5 |

We claim:

1. A method for the production of an α-amino-ω-lactam of the formula:

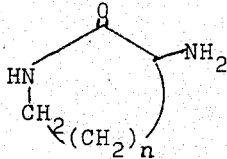

wherein $n$ is an integer of 2 or 3, comprising the steps of:

a. contacting the corresponding α-aminocycloalkanone oxime or mineral acid salt thereof with liquid sulfur dioxide containing at least about 1 mole sulfur trioxide per mole α-aminocycloalkanone oxime until a two-phase system comprising a liquid $SO_2$ phase and an insoluble lactam precursor phase is formed;

b. separating the liquid sulfur dioxide phase from the insoluble phase containing the lactam precursor;

c. hydrolyzing and neutralizing the insoluble lactam precursor phase; and d. recovering the free lactam product.

2. The method of claim 1 wherein the lactam precursor is neutralized and hydrolyzed simultaneously using an aqueous solution of ammonium sulfate and ammonia.

3. The method of claim 1 wherein about 1.5–2.5 moles sulfur trioxide are present per mole α-aminocycloalkanone oxime.

4. The method of claim 1 wherein about 2 to 20 moles sulfur dioxide are present per mole sulfur trioxide.

5. The method of claim 1 wherein the α-aminocycloalkanone oxime is present in the form of its hydrochloride salt.

6. The method of claim 1 wherein the α-aminocycloalkanone oxime is α-aminocyclohexanone oxime.

7. The method of claim 1 wherein the reaction temperature in step (a) is maintained at about 25°–125°C. and the reaction pressure is about 0.3–50 atmospheres.

8. The method of claim 1 wherein the liquid sulfur dioxide phase separated in step (b) is recycled to step (a).

* * * * *